G. E. COOK.
GEAR SHIFTING DEVICE.
APPLICATION FILED OCT. 15, 1915.
1,201,806.
Patented Oct. 17, 1916.
2 SHEETS—SHEET 1.
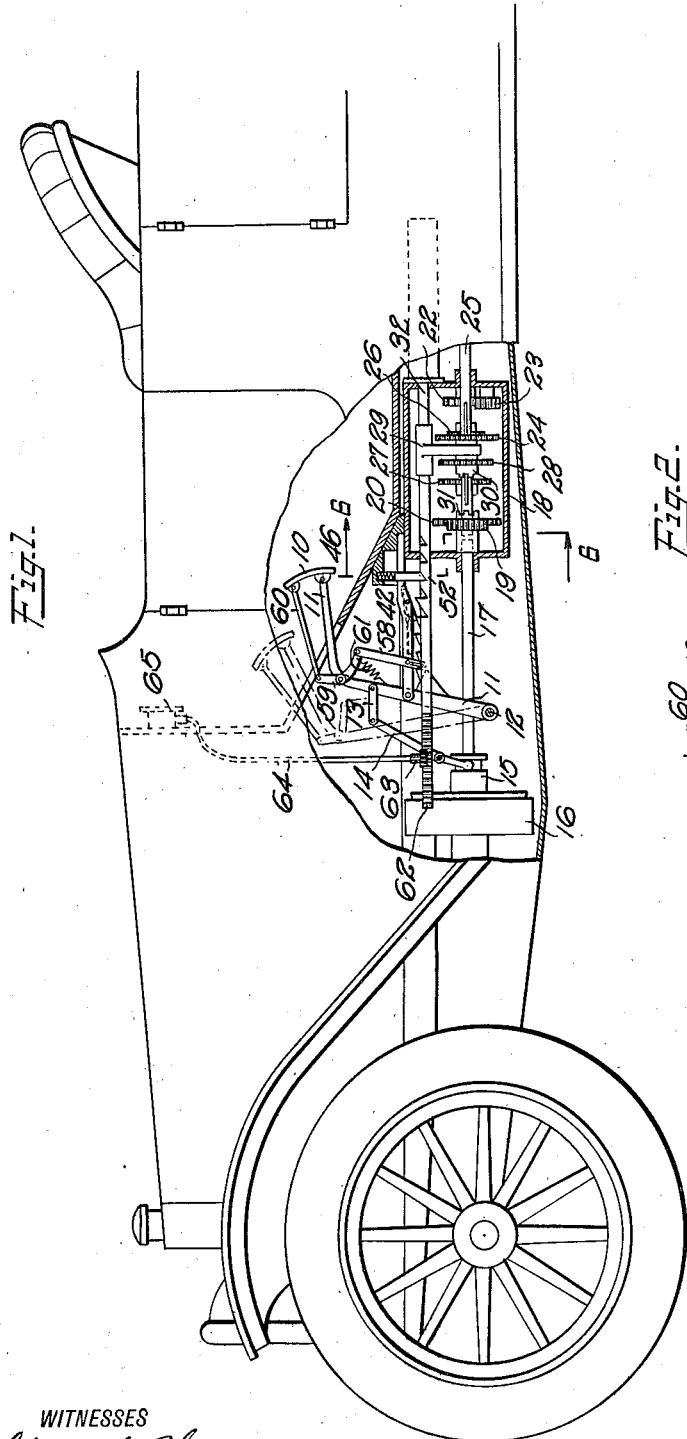
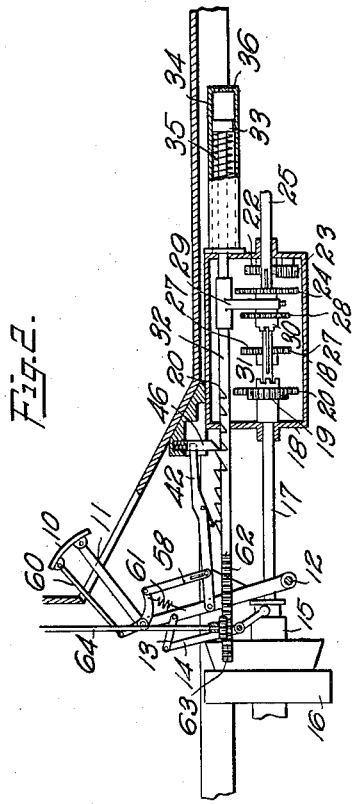
WITNESSES
George L. Blume.
INVENTOR
G. E. Cook
BY
ATTORNEYS G. E. COOK.
GEAR SHIFTING DEVICE.
APPLICATION FILED OCT. 15, 1915.
1,201,806.
Patented Oct. 17, 1916.
2 SHEETS—SHEET 2.
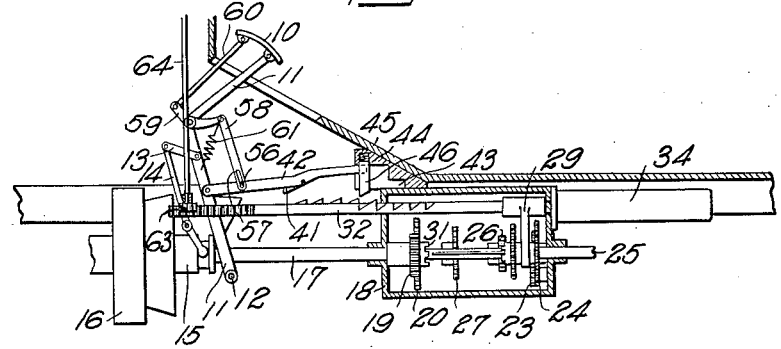
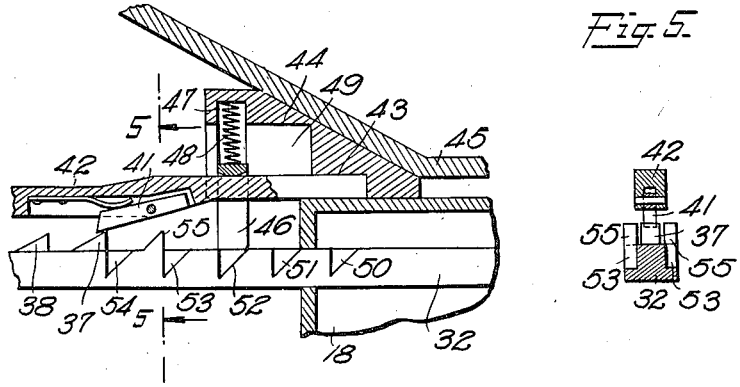
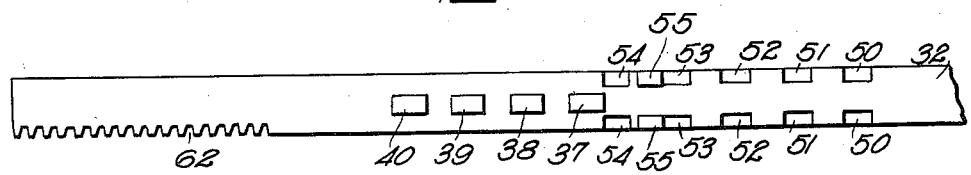
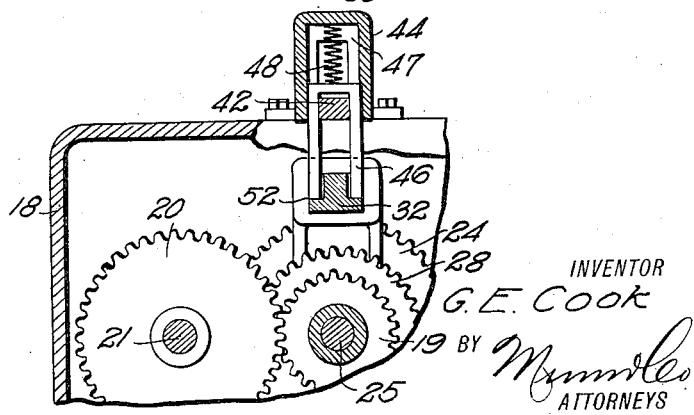
WITNESSES
INVENTOR
G. E. Cook
BY
ATTORNEYS

UNITED STATES PATENT OFFICE.

GEORGE ELWOOD COOK, OF NEW YORK, N. Y.

GEAR-SHIFTING DEVICE.

1,201,806.  Specification of Letters Patent.  Patented Oct. 17, 1916.

Application filed October 15, 1915. Serial No. 55,975.

*To all whom it may concern:*

Be it known that I, GEORGE E. COOK, a citizen of the United States, and a resident of the city of New York, Coney Island, borough of Brooklyn, in the county of Kings and State of New York, have invented a new and Improved Gear-Shifting Device, of which the following is a full, clear, and exact description.

The object of the invention is to provide a new and improved gear shifting device more especially designed for use on automobiles and similar machines and arranged to dispense with the change speed lever and to allow the driver to readily shift the gear to any desired speed on manipulating the clutch pedal.

In order to accomplish the desired result, use is made of an actuating means connecting the clutch controlling device with the change speed gearset to set the latter to any desired position, that is, for low speed, high speed, intermediate speed, neutral position and reversed position.

A practical embodiment of the invention is represented in the accompanying drawings forming a part of this specification, in which similar characters of reference indicate corresponding parts in all the views.

Figure 1 is a side elevation of the gear-shifting device as applied to an automobile, part of which is shown in section and the gearset being in first speed position; Fig. 2 is a similar view of the same with the speed gearset in closed position; Fig. 3 is a like view of the same with the gearset in reversed position; Fig. 4 is an enlarged sectional side elevation of part of the gear shifting device; Fig. 5 is a cross section of the same on the line 5—5 of Fig. 4; Fig. 6 is a similar view of the same on the line 6—6 of Fig. 4; and Fig. 7 is an enlarged plan view of the shifting bar for the gearset.

The pedal 10 of the clutch operating device is pivoted on the upper end of a rock lever 11 fulcrumed at 12 on the chassis of the automobile, and the said lever 11 is connected by a link 13 with the clutch shifting device 14 engaging the movable clutch member 15 of the clutch 16 adapted to connect the engine or crank shaft with the transmission shaft 17 in the usual manner. The transmission shaft 17 extends into the box 18 of the change speed gearset and on the end of the said transmission shaft 17, extending within the box 18, is secured the stand drive gear wheel 19 in mesh with the countershaft drive gear wheel 20 secured on the countershaft 21 journaled in the box 18. On the countershaft 21 is secured a pinion 22 in mesh with an intermediate pinion 23 journaled in the box 18 and adapted to be engaged by the first gear wheel 24 (see Fig. 3) mounted to turn with and to slide lengthwise on the drive shaft 25 journaled in the box 18 and in the hub of the drive gear wheel 19. The drive shaft 25 is connected with the axle or other part to be driven. The gear wheel 24 is also adapted to engage a gear wheel 26 (see Fig. 1) secured on the countershaft 21 on which is also secured a gear wheel 27 intermediate the gear wheels 26 and 20. The gear wheels 27 and 20 are adapted to be engaged by a gear wheel 28 mounted to turn with and to slide lengthwise on the drive shaft 25. The gear wheels 24 and 28 are engaged by a shifting member 29 for shifting the said gear wheels lengthwise on the drive shaft 25, as hereinafter more fully explained. The gear wheel 28 is provided with a clutch member 30 adapted to engage a clutch member 31 forming part of the gear wheel 19 previously mentioned.

The shifting member 29 is attached to a shifting bar 32 mounted to slide lengthwise on the box 18 and the rear end of the said bar 32 projects beyond the rear end of the box 18 and terminates in a piston 33 reciprocating in a cylinder 34 attached to the box 18. A spring 35 is coiled around the rear end of the bar 32 and extends within the cylinder 34 and the said spring 35 presses against the front face of the piston 33 to move the bar 32 and its piston 33 rearwardly whenever the said bar 32 is released, as hereinafter more fully explained. The rear end of the cylinder 34 is provided with small air holes 36 for the escape of air from the cylinder 34 during the rearward movement of the bar 32 and its piston 33 to provide an air cushion for the piston during the return movement thereof.

The shifting bar 32 is provided on top with a series of ratchet teeth 37, 38, 39 and 40 adapted to be engaged by a spring-pressed pawl 41 fulcrumed on an actuating arm 42 having its forward end pivotally connected with the rock lever 11. The rear end of the actuating arm 42 engages at times a bearing 43 formed in a bracket 44 attached to the under side of the bottom 45 of the automobile body, and the said actuating arm 42 extends through a U-shaped locking latch 46 mounted to slide vertically in a bearing 47 formed in the bracket 44, as plainly shown in Figs. 4 and 6. A spring 47 presses the top of the latch 46 to normally hold the latter in a lowermost position but to allow the latch to slide upward on swinging the arm 42 in an upward direction, as hereinafter more fully explained, the rear end of the arm 42 then being out of engagement with the bearing 43 and adapted to swing upward in a recess 49 formed in the bracket 44. The latch 46 is adapted to engage pairs of latch recesses 50, 51, 52, 53 and 54 formed in the top of the bar 32 at the sides thereof, as plainly indicated in the drawings, and the said latch 46 is also adapted to engage a pair of teeth 55 arranged in the front of the pair of notches 53, as plainly indicated in Figs. 4 and 7.

The arm 42 is provided near its forward end with a pin 56 engaging a slot 57 formed in a link 58 pivotally connected with a lever 59 fulcrumed on the rock lever 11. The lever 59 is pivotally connected by a link 60 with the upper end of the pedal 10 so that when a rocking motion is given to this pedal 10 an upward swinging motion is given to the arm 42 for releasing the bar 32, as hereinafter more fully explained. A spring 61 connects the rear end of the lever 59 with the rock lever 11 to normally hold the pedal 10 in a nearly upright position at the time the lever 11 is in rearmost position, as indicated in Fig. 1. The bar 32 is provided at one side at the forward end thereof with teeth 62 in mesh with a pinion 63 secured on the lower end of a shaft 64 connected with the mechanism of an indicating device 65 mounted on the automobile body in front of the driver to indicate the various positions of the gearset.

The operation is as follows: When the parts are in the position shown in Fig. 1 the gear wheel 24 is in mesh with the gear wheel 26 and the gear wheel 20 is in mesh with the gear wheel 19, so that when the engine is running the power of the engine shaft is transmitted by way of the clutch 16, transmission shaft 17 and the gearing just described to the drive shaft 25 to rotate the latter at first speed. The pawl 41 now rests on the top of the first tooth 37 and the latch 46 engages the pair of notches 52, as shown in Figs. 1 and 4. When it is desired to shift the gearset to a next higher speed, that is, to disengage the gear wheel 24 from the gear wheel 26 and to engage the gear wheel 28 with the gear wheel 27 then the operator pushes the pedal 10 forward so that the clutch 16 is temporarily moved into released position, and at that time the pawl 41 has moved into engagement with the tooth 38 thus pushing the bar 32 forward until the latch 46 drops into the pair of notches 51 at which time the pedal 10 and the rock lever 11 have reached the position indicated in dotted lines in Fig. 1. The forward motion of the bar 32 carried the shifting member 29 along with it and the gear wheels 24, 28 so that the gear wheel 24 moved out of mesh with the gear wheel 26 and the gear wheel 28 moved into mesh with the gear wheel 27 to drive the shaft 25 at intermediate speed. It is understood that after the parts have been shifted as described the operator releases the pressure on the pedal 10 to allow the latter and the rock lever 11 to return to normal position. When it is desired to move the gearset into high speed position, the above described operation is repeated so that the pawl 41 acts on the tooth 37 to move the bar 32 forward until the latch 46 drops into the notches 50. The forward movement of the bar 32 causes the gear wheel 28 to move out of mesh with the gear wheel 27 and to cause the clutch member 30 to move into engagement with the clutch member 31 whereby the drive shaft 25 is driven direct and in unison with the transmission shaft 17. When it is desired to move the gearset from high speed position into neutral position (see Fig. 2) then the pedal 10 is pushed forward to extreme forward position with a view to disengage the rear end of the actuating arm 42 from the bearing 43 and to swing the said bar upward by the action of the link 58 connected with the lever 59. When this takes place the pawl 41 moves out of engagement with the last tooth 40 and the latch 46 is lifted out of the notches 50 thus releasing the bar 32 and allowing the same to move rearward by the action of its spring 35. The same operation is performed when it is desired to move the shifting device from any other position to neutral position; the pawl 41 being raised and held above all of the teeth 37, 38, 39, and 40 to allow the bar 32 to slide rearward by the action of its spring. The rearward movement of the bar 32 is limited by the pair of teeth 55 finally striking the latch 46 held in raised position so that further return or backward movement of the bar 32 is prevented. By reference to Fig. 2 it will be noticed that when the parts are in this position the shaft 17 and the countershaft are disconnected entirely from the drive shaft 25. When it is desired to reverse the gearing then the operator pushes the pedal 10 forward into extreme position and then imparts a swinging motion to the pedal 10 (see Fig. 3) to cause the arm 42 to swing upward into uppermost position thereby raising the latch 46 above the teeth 55 and lifting the pawl 41 above the teeth 37, 38, 39 and 40 thus completely releasing the bar 32 and allowing the spring 35 thereof to move the bar 32 backward to extreme rearmost position in which the gear wheel 24 is in mesh with the pinion 23 driven by the gear wheel 22 from the countershaft. When this position has been reached the operator releases the pedal 10 so that the arm 42 swings downward and allows the latch 46 to drop into the notches 54 to hold the bar 32 locked against accidental movement during the time the gearset is in reversing position. It is understood that the latch 46 drops into the corresponding set of notches 50, 51, 52, 53 or 54 at each return of the pedal 10 so that accidental rearward movement of the bar 32 by the action of the spring 35 is prevented. It is understood that when the pedal 10 is in the position of rest as shown in Fig. 1, the pin 56 is in the upper end of the slot 57 and when the pedal 10 is moved forward the link 58 is gradually raised until the lower end of the slot 57 is in engagement with the pin. Thus during a normal forward movement of the pedal 10 and the lever 11 from the position shown in full lines in Fig. 1 to the position shown in dotted lines in Fig. 1 the arm 42 is not swung upward, but when the pedal 10 and the lever 11 are swung into an extreme forward position, as shown in Fig. 2, the link 58 imparts an upward swinging motion to the arm 42 to lift the latch out of the notches 50, 51, 52 or 53, and when the pedal 10 and the lever 11 are swung into an extreme forward position and the pedal 10 is also rocked forwardly, as shown in Fig. 3, then the arm 42 is swung into extreme uppermost position by the action of the link 60, lever 59 and link 58 so that the latch 46 is raised to clear the pair of teeth 55.

When the mechanism is in first or second gear speeds and it is desired to return to neutral position without engaging all the speeds, it is only necessary for the operator to push the pedal 10 a short distance forward and then downward to release the bar 32 and allow the same to return to neutral position by the action of the spring 35, as above explained.

From the foregoing it will be seen that by the arrangement described any speed may be obtained by merely actuating the foot pedal and the change speed lever is completely dispensed with, hence the driver has free use of both hands for manipulating the other parts of the automobile at the time. It is also understood that the operator can readily manipulate the pedal 10 as the indicator 65 indicates when the gearset reaches the desired position.

Having thus described my invention, I claim as new and desire to secure by Letters Patent:

1. In a gear shifting device for automobiles and the like, the combination of a change speed gearset having a shiftable member, a clutch operating device having a pedal mounted to rock, locking means adapted to engage the said shiftable member, and means connected with the said clutch pedal and controlling the said shifting member and said locking means.

2. In a gear shifting device for automobiles and like vehicles, the combination of a clutch operating device having a rocking pedal, a change speed gearset having a shiftable member provided with a spring-pressed bar, means connected with the said pedal and adapted to engage and shift the said bar to shift the gearset to any desired position, and locking means for the said bar controlled from the said pedal.

3. In a gear shifting device for automobiles and like vehicles, the combination of a change speed gearset having a shiftable member provided with a spring pressed bar, the said bar having teeth and notches, a locking latch adapted to engage the said notches, a pawl adapted to engage the said teeth, an arm mounted to swing and carrying the said pawl, the said arm engaging the said latch, a clutch operating device having a pedal, and a connection between the swinging arm and the pedal.

4. In a gear shifting device for automobiles and the like, the combination of a change speed gearset having a shiftable member provided with a spring-pressed bar, a clutch operating device having a pedal, a locking latch adapted to engage the said bar, an arm mounted to swing on the said clutch operating device and controlling the said bar and the said latch, and a connection between the said arm and the said pedal.

5. In a gear shifting device for automobiles and like vehicles, the combination of a clutch operating device having a rocking pedal, a change speed gearset having a shiftable member provided with a spring-pressed bar, a locking latch adapted to engage the said bar, an arm mounted to swing on the said clutch operating device and controlling the said bar and the said latch, a lever fulcrumed on the said clutch operating device, a link connecting the said lever with the said arm, and a link connecting the said lever with the said pedal.

6. In a gear shifting device for automobiles and like vehicles, the combination of a clutch operating device having a rocking pedal, a change speed gearset having a shiftable member provided with a spring-pressed bar, a locking latch adapted to engage the said bar, an arm mounted to swing on the said clutch operating device and controlling the said bar and the said latch, a connection between the said arm and the said pedal, and means for holding the said arm in sliding engagement with the said bar.

7. In a gear shifting device for automobiles and like vehicles, the combination of a clutch operating device having a rocking pedal, a change speed gearset having a shiftable member provided with a spring-pressed bar, the said bar having a series of teeth and notches, a spring-pressed locking latch adapted to engage one of the said notches at a time, an arm mounted to swing on the said clutch operating device and provided with a spring-pressed pawl adapted to engage the said teeth, the said arm slidingly engaging the said latch, a lever fulcrumed on the said clutch operating device, a link connecting the said lever with the said arm, and a link connecting the said lever with the said pedal.

8. In a gear shifting device for automobiles and like vehicles, the combination of a clutch operating device having a rocking pedal, a change speed gearset having a shiftable member provided with a spring-pressed bar, the said bar having a series of teeth and notches, a spring-pressed locking latch adapted to engage one of the said notches at a time, an arm mounted to swing on the said clutch operating device and slidingly engaging the said latch, the said arm having a pawl adapted to engage the said teeth, a lever fulcrumed on the said clutch operating device, a link connecting the said lever with the said arm, a link connecting the said lever with the said pedal, and an indicator controlled by the said bar.

9. In a gear shifting device for automobiles and the like, the combination of a change speed gearset having a shiftable member provided with a spring pressed bar, the said bar having teeth and notches, a clutch operating device including a pedal and a rock lever to which the pedal is pivoted, a locking latch adapted to engage the said notches, a pawl adapted to engage the said teeth, an actuating arm carrying the said pawl and pivotally connected with the said rock lever, the said arm engaging the said latch, a lever fulcrumed on the rock lever, and connections between the said lever, and the pedal and the actuating arm.

In testimony whereof I have signed my name to this specification in the presence of two subscribing witnesses.

GEORGE ELWOOD COOK.

Witnesses:
   THEO. G. HOSTER,
   PHILIP D. ROLLHAUS.